3,088,903
NUCLEAR REACTOR CONTROL MEANS
Arthur Firth, Altrincham, England, assignor to United Kingdom Atomic Energy Authority, London, England
Filed Feb. 18, 1960, Ser. No. 9,463
Claims priority, application Great Britain Feb. 26, 1959
4 Claims. (Cl. 204—193.2)

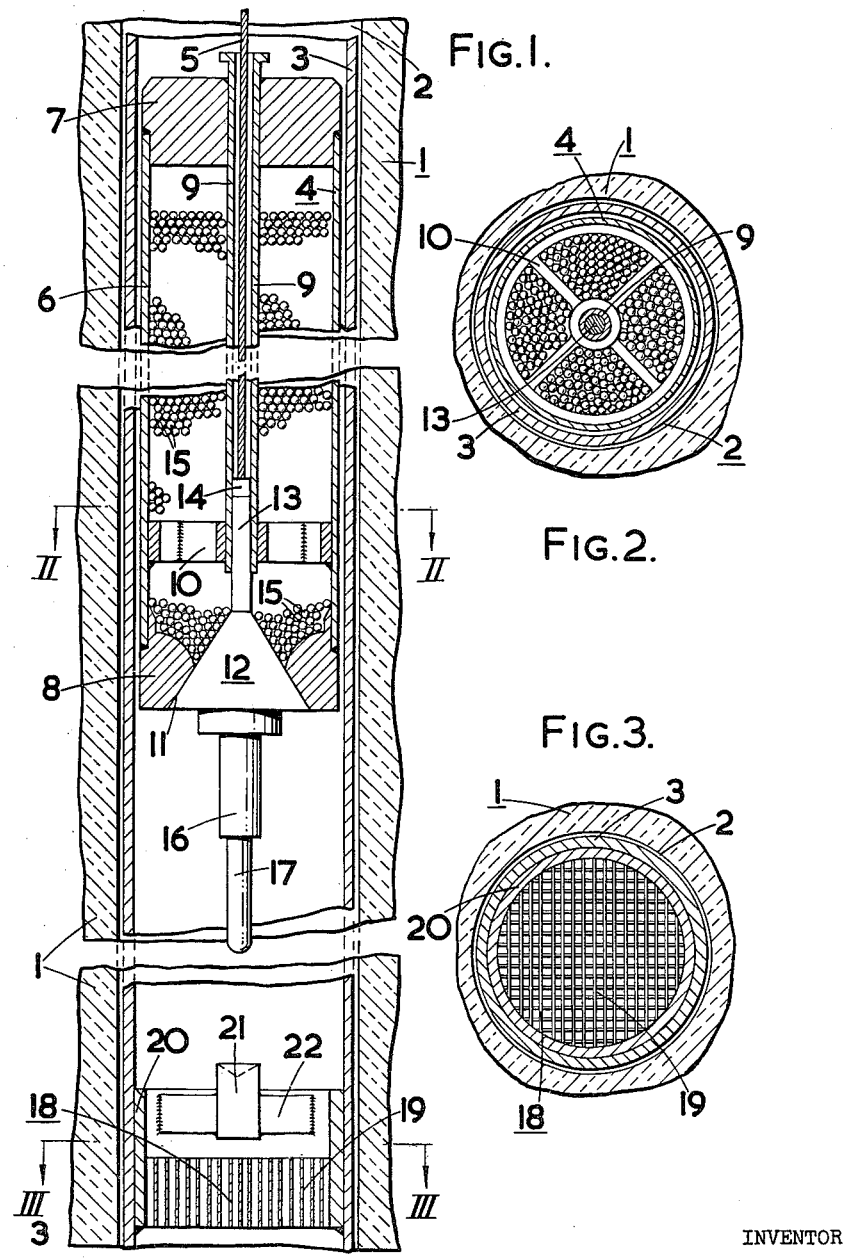

This invention relates to nuclear reactors. In nuclear reactor technology it is common practice to provide control members of neutron absorbing material which are insertable into and removable from the reactor core structure. Such control members include fine and coarsely adjustable control rods which are normally used in a controlled-insertion manner in control channels in the core structure of the reactor in order to obtain control of reactivity during operation of the reactor and also include shut down rods which while the reactor is operating are fully removed from the reactor core structure and which are inserted into control channels in the core structure to effect shut down. Where the nuclear reactor is installed in a moving body such as a ship, or is landbased in regions subject to seismic disturbance, disarrangement or misalignment of the core can result in departure from linearity of the control channels with consequent prevention of the control and shut down rods from being inserted into the reactor core structure to effect shut down.

In co-pending U.S.A. application Serial No. 824,247 there is described a device for effecting shut down of a nuclear reactor in which a multiplicity of discrete bodies formed of or containing material having a high neutron absorbing characteristic are charged into the core structure of the nuclear reactor. The device can comprise a tube located in a substantially vertical channel in the reactor core structure and having its lower end normally closed, the bodies being chargeable into the tube on operation of the device. In one arrangement the bodies in the form of spheres are held in a magazine having outlets connecting with the upper charging end of the tube. Means are provided for applying a magnetic field across the outlets and the bodies include material which is magnetic but which has a low retentivity and coercivity so that discharge of the bodies through the outlets into the tube is prevented until such time as the magnetic field is removed.

The use of such devices complicates the construction of a nuclear reactor in that channels have to be provided additional to those required for the accommodation of normal control and shut down rods. Also access to the devices has to be provided through the pressure vessel containing the reactor core structure with consequent weakening of the pressure vessel.

According to the invention a control member adapted for movement in a control channel passing substantially vertically through the core structure of a nuclear reactor, comprises a casing of elongated form and having an attached lifting cable, a moveable member at the lower end of the casing normally held by tension of the lifting cable in a position closing the lower end of the casing, and said casing being adapted to contain a loosely packed mass of discrete particulate bodies of material having a neutron absorbing characteristic whereby should the control member whilst being lowered become prevented from being further lowered, relaxation of tension in the lifting cable allows said member to move so as to open the lower end of the casing for consequent discharge of the mass of particulate bodies into the control channel.

Preferably the bodies are of spherical shape so as to reduce to a minimum the possibility of jamming of the bodies in the casing.

The lifting cable may be led through the casing via an axially located guide tube which extends part way through the casing from the upper end thereof, said lifting cable being connected with the moveable member which can comprise a moveable plug co-operating with a seating at the lower end of the casing.

There may be a dischargeable tube lining the control channel, the dischargeable tube being fitted at its lower or non charging end with a deep box grid which allows passage of coolant gas through the tube but which provides for retention of the particulate bodies in the tube when discharge of said bodies occurs from the casing into the tube.

One embodiment of the invention will now be described by way of example with reference to the accompanying drawings in which:

FIG. 1 is a fragmentary side view in medial section of a control member according to the invention in a channel in the core structure of a nuclear reactor. FIGS. 2 and 3 are plan views in section on the lines II—II and III—III of FIG. 1 respectively.

In FIG. 1 there is shown part of the core structure 1 of a nuclear reactor. A channel 2 passing vertically through the core structure 1 is lined with a tube 3 which contains a control member 4 (which maybe either a control rod or a shut down rod) of elongated cylindrical form suspended from a lifting cable 5. The control member 4 comprises a tubular casing 6 fitted with upper and lower end adaptors 7 and 8 respectively. The end adaptor 7 closes the upper end of the casing 6 and locates the upper end of a guide tube 9 for the lifting cable 5. The guide tube 9 is located axially inside the casing 6 by a spider 10 (see FIG. 2). The lower end adaptor 8 forms a seating 11 for a conical plug 12 which has a tubular extension 13 slidable in the lower end of the guide tube 9. The lifting cable 5 is fitted with an end ferrule 14 which is screwed into the extension 13 of the plug 12. The casing 6 is filled with boron steel shot 15, and the plug 12 carries an impact absorbing device 16 having a downwardly extending impact pin 17. The device 16 may for example be as described and shown in FIG. 2 of U.S.A. patent application Serial No. 665,812.

The tube 3 is fitted at its lower end (FIG. 3) with a deep box grid 18 comprising a series of interlaced webs 19 and a supporting sleeve 20 welded inside the tube 3. The size of the holes formed by the interlaced webs 19 is such that the shot 15 is prevented from dropping through the grid 18. An impact stool 21 is mounted inside the sleeve 20 on spider arms 22. The impact stool 21 is arranged to receive the impact pin 17 of the impact absorbing device 16 should the control member 4 fall freely in the tube 3 as would occur on breakage of the lifting cable 5.

In normal use the control member 4 is raised out of and lowered into the reactor core structure 1 by means of the lifting cable 5 acting through the ferrule 14, extension 13, plug 12, end adaptor 8 and casing 6 in order to control the reactivity of the reactor. The plug 12 is held against the seating 11 by tension in the lifting cable 5 and thus discharge of the shot 15 from the control member 4 into the tube 3 is prevented.

During normal operation of the reactor coolant gas is passed through the tube 3 over the control member 4 and the deep box grid 18 does not present any appreciable hindrance to the flow of the coolant gas.

However, if the reactor is subjected to a serious physical disturbance, due for example to an earthquake, disarrangement or misalignment in the core structure 1 can occur with consequent distortion of the tube 3. In such circumstances the control member 4 can jam in the tube 3 and on this occurring during an attempt to lower the member 4 into the reactor core, slackening of tension in the lifting cable 5 allows the plug 12 to drop under its own weight and the weight of the boron steel shot 15 above it so that the shot 15 discharges from the casing 6 into the tube 3. The shot 15 is retained in the tube 3 by the grid 18 and hence contributes to shutting down of the reactor, it of course being understood that such discharge of shot also occurs from all those control members of the reactor which are or become similarly jammed. It is also arranged under such conditions that those control members (control and shut-off rods) still having freedom of movement fall into the core structure of the reactor and thus also contribute to shutting down the reactor.

I claim:

1. In a nuclear reactor core structure having a substantially vertical channel passing therethrough, reactor control means comprising cable means extending down into the channel for movement therein and having a plug member supported thereon, and means defining an elongate casing resting on the plug member in the channel for movement with the cable and having an opening in the base thereof, said casing containing a loosely packed mass of neutron absorbing bodies each adapted to pass through the opening, and said plug member being so engaged in the opening as to normally prevent flow of the bodies therethrough but releasable therefrom under its own weight to discharge the bodies when relieved from supporting the casing.

2. A nuclear reactor core structure according to claim 1 further comprising means in the casing defining a guide tube for the cable, said cable extending through the guide tube and adjacent the opening for attachment with the plug member.

3. A nuclear reactor core structure according to claim 2 further comprising a dischargeable tube lining the channel and in which the casing is disposed, said dischargeable tube having a perforated member extending across its lower end portion to retain the bodies upon their discharge through the opening.

4. A nuclear reactor core structure according to claim 3 wherein the bodies are spherical in form.

References Cited in the file of this patent

Research Reactors (TID–5275), pages 414, 415; published by U.S.A.E.C. (1955).